United States Patent [19]

Haskell et al.

[11] Patent Number: 5,543,853
[45] Date of Patent: Aug. 6, 1996

[54] ENCODER/DECODER BUFFER CONTROL FOR VARIABLE BIT-RATE CHANNEL

[75] Inventors: Barin G. Haskell, Tinton Falls; Amy R. Reibman, East Windsor, both of N.J.

[73] Assignee: AT&T Corp., Murray Hill, N.J.

[21] Appl. No.: 386,992

[22] Filed: Jan. 19, 1995

[51] Int. Cl.$^6$ ..................................... H04N 7/12
[52] U.S. Cl. .................. 348/497; 348/466; 348/419
[58] Field of Search ...................... 348/497, 466, 348/464, 500, 426, 17, 419, 423; 370/105.1; H04N 7/12

[56] References Cited

U.S. PATENT DOCUMENTS

| | | | |
|---|---|---|---|
| 5,036,391 | 7/1991 | Auvray et al. | 348/500 X |
| 5,159,447 | 10/1992 | Haskell et al. | 358/133 |
| 5,287,182 | 2/1994 | Haskell et al. | 348/500 |
| 5,376,969 | 12/1994 | Zdepski | 348/466 |
| 5,381,181 | 1/1995 | Deiss | 348/500 |

OTHER PUBLICATIONS

IEEE Transactions on Circuits and Systems for Video Technology, vol. 2, No. 4, Dec. 1992 entitled "Constraints on Variable Bit-Rate Video for ATM Networks", authored by Amy R. Reibman and Barry G. Haskell.

CCIT Study Group XV WP XV/1, Experts Group for ATM Video Coding, Paris 23–24, May 1991, Document No. AVC–56, entitled "Constraints on Variable Bit-Rate Video for ATM Networks", authored by Barry G. Haskell and Amy R. Reiban.

CCITT SG XV, Working Party XV/1, Experts Group on ATM Video Coding, AVC–315, ISO–IEC/JTC1/SC29/WG11, MPEG 92/396, Jul. 1992, entitled "Timing Recovery for Variable Bit-Rate Video on ATM Networks", authored by Barry G. Haskell and Amy R. Reibman.

Primary Examiner—Victor R. Kostak
Attorney, Agent, or Firm—Thomas Stafford

[57] ABSTRACT

Encoder/decoder buffer overflow and underflow encountered when employing actually variable or effectively variable bit-rate channels for communicating encoded video images and corresponding audio signals are overcome by adjusting the parameters of a video encoder in response to a representation of cell delay variation, i.e., jitter, determined at a remote decoder.

1 Claim, 4 Drawing Sheets

ENCODER/DECODER BUFFER CONTROL FOR VARIABLE BIT-RATE CHANNEL

TECHNICAL FIELD

This invention is related to video image processing and, more particularly, to avoiding encoder and decoder buffer overflow and underflow when the image is transmitted over a variable bit-rate channel.

BACKGROUND OF THE INVENTION

ISO MPEG standards group is in the process of defining a Real Time Interface (RTI) specification for video encoders/decoders which constrains the real-time byte delivery schedule of transport bit-streams to real decoders. A real time decoder model includes three (3) buffers for each elementary video bit-stream: the transport buffer, the multiplexing buffer and an elementary bit-stream buffer. These buffers are intended to be sized to take into account the fact that bytes in the elementary bit-stream will arrive at a decoder with some jitter. When the video bit-stream has been transmitted over an Asynchronous Transport Mode (ATM) network, the jitter is referred to as Cell Delay Variation (CDV).

Transform coding techniques and other systems for compressing video motion pictures are well known. Specifically, in our article entitled "Constraints on Variable Bit-Rate Video for ATM Networks", *IEEE Transactions on Circuits and Systems for Video Technology*, Volume 2, Number 4, pages 361–372, December 1992, we indicated that, assuming no delay jitter, the encoder could prevent decoder buffer overflow and underflow by computing the actual decoder buffer fullness. (Also see our U.S. Pat. No. 5,159,447 issued Oct. 27, 1992.)

Additionally, in our standards contribution entitled "Timing Recovery for Variable Bit-Rate Video on ATM Networks", MPEG92/396, AVC-315, Paris France, Jul. 3, 1992, we disclosed a decoder which, in the presence of jitter, prevents decoder buffer overflow and underflow by incorporating additional delay and additional decoder buffer capacity. (Also see our U.S. Pat. No. 5,287,182 issued Feb. 15, 1994.) Given guaranteed bounds on jitter, decoder buffer overflow and underflow could be eliminated by chosing sufficiently large buffers and sufficiently large jitter delay. This solution can be thought of as having the decoder use its available buffer capacity to shift the so-called Video Buffer Verifier (VBV) to ensure that there is no buffer overflow or underflow. In practice, the decoder buffer may not have enough capacity to absorb both the VBV fluctuations and the jitter. In addition, it incurs additional decoding delay, and is practical only for the elementary bit-stream decoder buffer.

SUMMARY OF THE INVENTION

The problems of encoder/decoder buffer overflow and underflow encountered when employing actually variable or effectively variable bit-rate channels for communicating encoded video images are overcome by generating information as to the cell delay variation (CDV) at the decoder which includes possible additional decoder buffer capacity that can be employed to accommodate the CDV. This information is transmitted to the encoder which then has the option of adjusting its parameters to avoid encode/decoder buffer overflow and underflow.

Advantages of this solution are that it alleviates the need for the decoder to be designed with enough buffer capacity to prevent overflow and underflow given the maximum possible jitter and, also minimizes the decoding delay.

DETAILED DESCRIPTION

Figure 1:
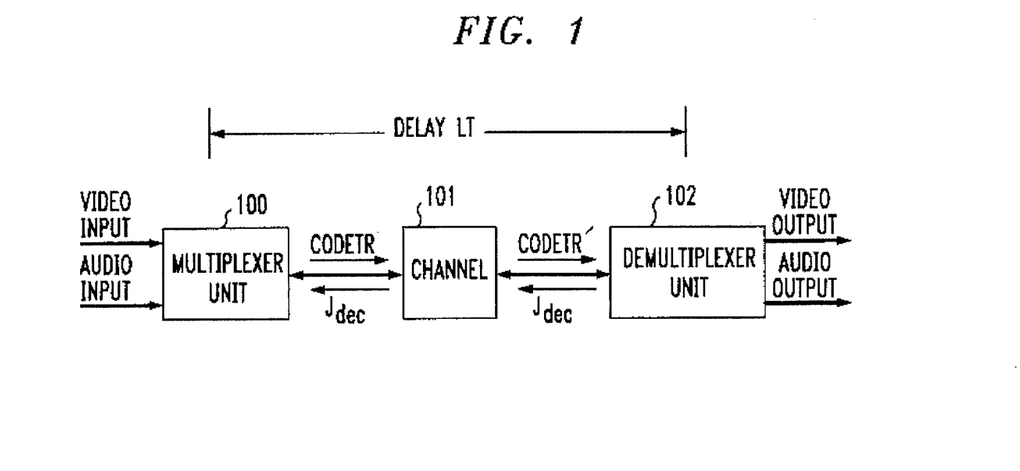
FIG. 1 shows, in simplified block diagram form, a multiplexer unit incorporating aspects of the invention, a variable bit-rate channel and a demultiplexer unit.

Shown in FIG. 1, in simplified block diagram form, are multiplexer unit 100, variable bit-rate channel 101 and demultiplexer unit 102, incorporating aspects of the invention. An original video input signal, VIDIN, that includes frames which contain at least one image representation, is supplied as an input of multiplexer 100. Such video signals are well known in the art. Also supplied to multiplexer unit 100 are a corresponding audio signal and $J_{dec}$. As described below, $J_{dec}$ is representative of the cell delay variation at a video decoder in demultiplexer unit 102 and is employed by a video encoder in multiplexer 100 to adjust its parameters to avoid encoder/decoder buffer overflow and underflow. Multiplexer 100 supplies as an output bit-stream CODETR which is transmitted across variable bit-rate channel 101 to demultiplexer unit 102. As described below, the bit-stream supplied as an output from multiplexer 100 also includes audio and other information necessary to properly decode the video and corresponding audio signals at demultiplexer unit 102. However, in the discussion below CODETR is assumed to be an encoded version of VIDIN.

It is assumed that the variable bit-rate channel 101 will be able to transmit at a desired bit-rate $R_i$. In many applications, however, the variable bit-rate channel 101 will be unaware whether or not it can transmit at the desired bit-rate $R_i$, as in an ethernet network or on an asynchronous transfer mode (ATM) network. In an ATM network, there may be a policing function or usage parameter control (UPC) function that is used to constrain the number of bits entering variable bit-rate channel 101. An aspect of this invention, is to mimic the UPC function at the channel rate control device 208 (FIG. 2) so as to prevent the UPC function in variable bit rate channel 101 from reducing the transmitted bit-rate below the desired bit-rate $R_i$. If the variable bit-rate channel 101 is capable of providing a determination as to whether or not it can transmit at the desired bit-rate $R_i$, then one skilled in the art can use the techniques disclosed in our U.S. Pat. No. 5,159,447, cited above, to make a request of variable bit-rate channel 101 and receive a determination from channel 101.

In some implementations, variable bit-rate channel 101 itself might perform the removal of the bits, so that its output may not equal its input. In such implementations, systems encoder, Enc_CR inserter and $J_{dec}$ extractor 210 (FIG. 2)

may only mark bits for deletion and the actual deletion of some or all bits is performed by channel 101 if it determines that the requested bit-rate cannot be made available. Alternatively, variable bit-rate channel 101 can determine on its own which bits should be dropped from the format of bit-stream CODEIM. The bit-rates $R_i$ that can be supplied by channel rate control 208 are not random, but are constrained in accordance with a predetermined function. Such channel constraint functions are well known, e.g., the leaky bucket function. Because of the constrained nature of variable bit-rate channel 101, the transmission at a particular bit-rate $R_i$ can serve to impose limitations on the bit-rate that may be available to variable bit-rate channel 101.

Figure 2:
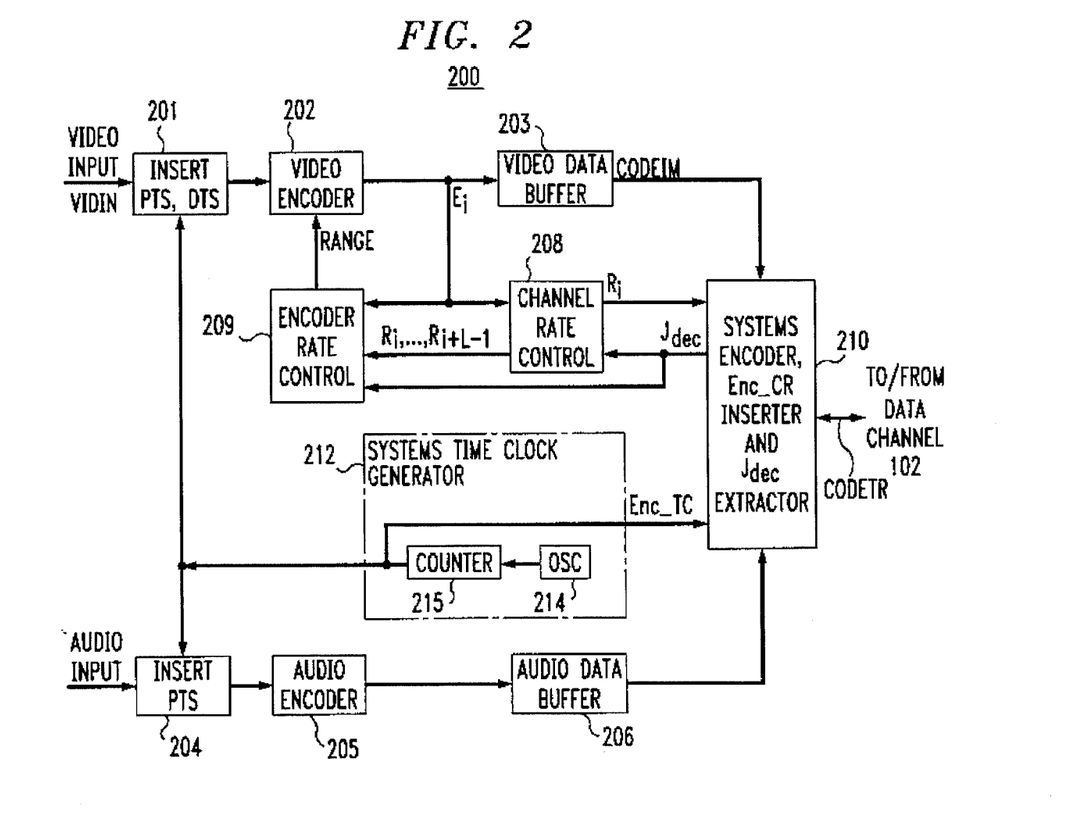
FIG. 2 shows, in simplified block diagram form, details of the multiplexer unit of FIG. 1.
Figure 3:
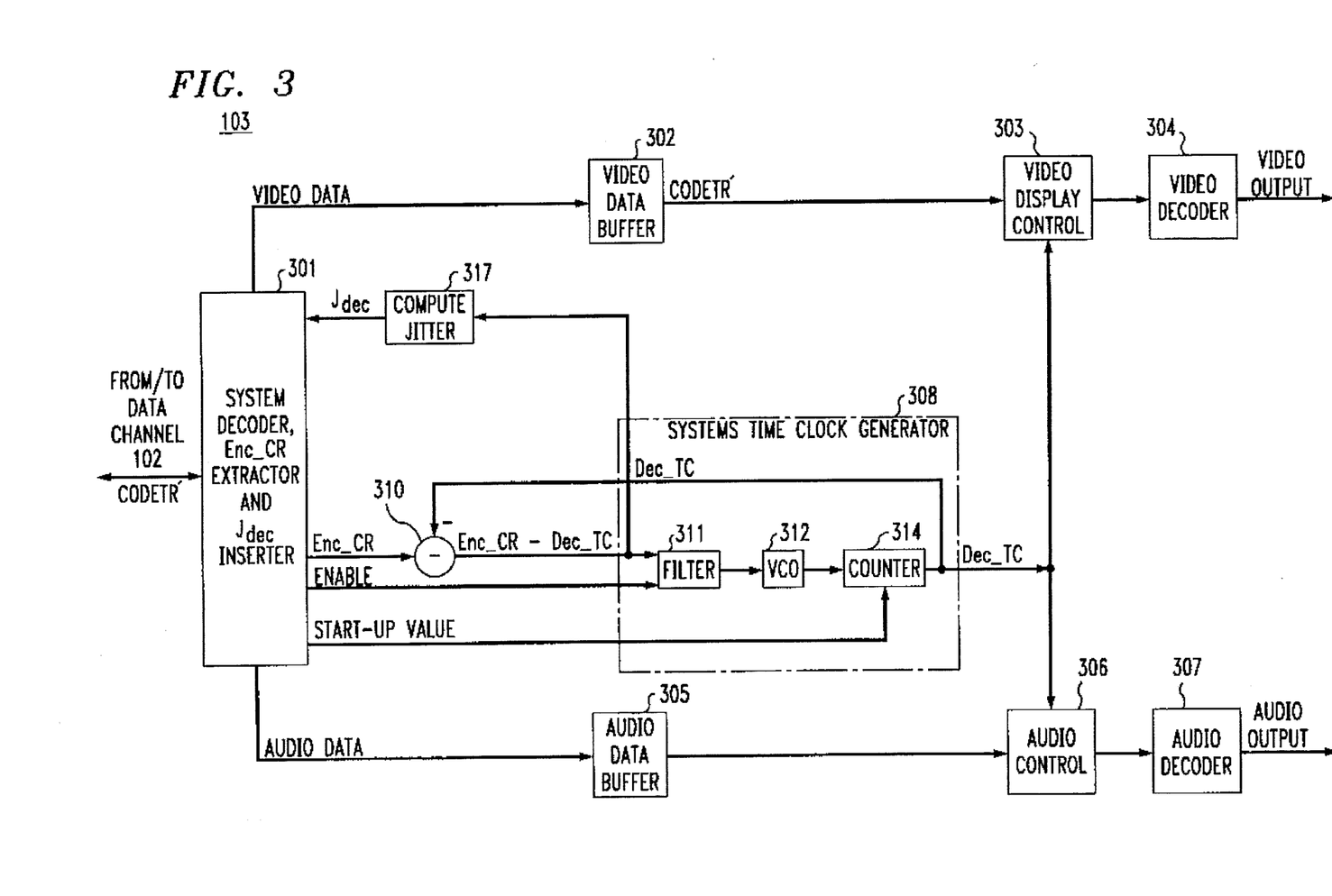
FIG. 3 shows, in simplified block diagram form, details of the demultiplexer unit of FIG. 1.

It is noted that for brevity and clarity of exposition, only a single channel of video and its corresponding audio are illustrated in the multiplexer unit 100 of FIG. 2 and the demultiplexer unit 102 of FIG. 3. In practice, it will be apparent that a plurality of channels of video and corresponding audio will be employed to be multiplexed for transmission in multiplexer unit 100 and a similar plurality of channels of video and corresponding audio will be obtained via demultiplexer 102.

Specifically, multiplexer unit 100, shown in FIG. 2 in simplified form, includes in the video channel insert PTS, DTS unit 201, video encoder 202 and video data buffer 203. The audio channel includes insert PTS unit 204, audio encoder 205 and audio data buffer 206. Data from video data buffer 203 and audio data buffer 206 are supplied to systems encoder, Enc_CR inserter and $J_{dec}$ extractor 210. Systems time clock generator 212 includes oscillator 214 and output counter 215. The output of counter 215 is the encoder time clock Enc_TC value which is supplied to insert PTS, STS unit 201, insert PTS unit 204 and systems encoder, Enc_CR inserter and $J_{dec}$ extractor 210. It is noted that according to the MPEG specifications, the frequency for oscillator 214 shall be 90 kHz±50 ppm. Additionally, the frequency drift of oscillator 214 shall not exceed 250 microhertz/second. In this embodiment, counter 215 supplies a 33-bit Enc_TC value as an output that is incremented once for each pulse supplied from oscillator 214.

The video input data is first supplied to insert PTS, DTS unit 201 which inserts Presentation Time Stamps (PTS) on some or all of the image representations, i.e., picture frames. If a PTS is inserted on a non-Bidirectionally Predicted Image Representation (nonB-picture), then a Decoding Time Stamp (DTS) must also be inserted. For these image representations, PTS exceeds DTS (in picture periods) by one plus the number of bidirectional image representations to be encoded. The resulting "time stamped" video data then passes to video encoder 202 where it is encoded in known fashion. In turn, the encoded video data is supplied to video data buffer 203 to await transmission via systems encoder, Enc_CR inserter and $J_{dec}$ extractor 210.

The input audio is in the form of so-called Audio Access Units (AAU), which are supplied to insert PTS unit 204 where PTS values are inserted on some or all of the AAUs. Thereafter, the AAUs are supplied to audio encoder 205 where they are digitally encoded in well-known fashion and, thereafter, supplied to audio data buffer 206 to await transmission via systems encoder, Enc_CR inserter and $J_{dec}$ extractor 210.

The PTS/DTSs are employed to control the decoding and displaying of the audio and video data in demultiplexer unit 102 (FIG. 3). The decoding and displaying in response to the PTS/DTSs are such as to maintain synchronism and to avoid overflow and underflow of data buffers in demultiplexer unit 102. Typically, the PTS/DTS values inserted by units 201 and 204 are equal to some constant value plus the instantaneous Enc_TC values from systems clock generator 212.

Systems encoder, Enc_CR inserter and $J_{dec}$ extractor 210 forms packs and packets of data and supplies them asynchronously to a data communications channel. Packs include packets from a plurality of video and audio encoders (not shown). Pack headers also contain encoder clock reference (Enc_CR) values that are the instantaneous values of Enc_TC from systems time clock generator 212. According to MPEG specifications, packs must be transmitted at least every 0.7 seconds. Thus, the Enc_CR values are transmitted at the rate of a few a second. Additionally, the MPEG specifications assume that the channel data rate is constant for the duration of the pack.

The packets in a pack contain video or audio data with the PTS/DTS values, if any, moved to the packet header. Hence, for situations of more than one PTS/DTS per packet, all except the first are discarded.

$R_i$ is a representation of the number of bits being transmitted to the data channel during the coding of image representation (picture) i which is generated by channel rate control 208 for a current image representation being transmitted, as described below, and supplied to systems encoder, Enc_CR inserter and $J_{dec}$ extractor 210. Systems encoder, Enc_CR inserter and $J_{dec}$ extractor 210 then chooses the actual values according to prescribed principles which are known Additionally, as described below, channel rate control 208 and encoder rate control 209 are employed in response to $J_{dec}$ supplied from demultiplexer 102 and $E_i$ supplied from video encoder 202 to control the parameters of video encoder 202.

FIG. 3 shows, in simplified block diagram form, details of demultiplexer unit 102. Specifically, shown are system decoder, Enc_CR extractor and $J_{dec}$ inserter 301, which supplies video information to be decoded to video data buffer 302 where it is stored awaiting display. Video data from buffer 302 is supplied to video display control 303 and, eventually, to video decoder 304. Similarly, audio data is supplied from systems decoder, Enc_CR extractor and $J_{dec}$ inserter 301 to audio data buffer 305 where it is stored awaiting display. Audio data from buffer 305 is supplied to audio display control 306 and, eventually, to audio decoder 307. Systems decoder, Enc_CR extractor and $J_{dec}$ inserter 301 also detects the received system clock reference (Enc_CR) values and passes them to systems time clock generator 308 along with an enable signal which indicates when there is a valid Enc_CR value being received and a start up value.

Systems time clock generator 308 is a phase locked loop including phase comparator 310, filter 311, voltage controlled oscillator (VCO) 312 and output counter 314. The enable signal from systems decoder, Enc_CR extractor and $J_{dec}$ inserter 301 is supplied to enable filter 311 when a valid Enc_CR value is received. The start up value is supplied to set counter 314 to the value of the initial Enc_CR value being received so that the initial audio or video data in the packets of the initial received pack may properly be displayed. The Dec_TC output from counter 314 is compared in phase comparator 310 to the received Enc_CR value. Filter 311 smooths the differences Enc_CR—Dec_TC and generates a control voltage which is used to control the frequency of VCO 312.

In the absence of transmission jitter delay, and assuming that the center frequency of VCO 312 is close to that of the oscillator 314 in multiplexer unit 100 (FIG. 2), the control signal output of filter 312 will eventually stabilize to a small, nearly constant value. If the frequency of oscillator 214 (FIG. 2) drifts slightly upward, then the Enc_CR values will increase slightly, producing a corresponding increase in the control voltage being supplied to VCO 312 which, in turn, increases its frequency. This, in turn, causes the Dec_TC values being supplied as an output from systems time clock generator 308 to increase slightly, thus tracking the values of the received Enc_CR. Similarly, for a decrease in frequency of oscillator 214, the Enc_CR and Dec_TC values in demultiplexer unit 102 track each other by also decreasing.

The amount of smoothing provided by filter 311, i.e., the time duration over which averaging occurs of the Enc_CR—Dec_TC difference signal, determines how fast VCO 312 can respond. A small amount of smoothing by filter 311 can cause a rapid alignment of Dec_TC and Enc_CR. However, if audio and video clocks were also derived from VCO 312, such a rapid alignment could be detrimental to the audio and video quality. In such an instance, significantly more smoothing by filter 311 may be necessary.

The gain of filter 311, or equivalently the input sensitivity of VCO 312, also has an effect on the frequency stability of the output pulses being supplied to counter 314. If the gain is large, then a small difference between Enc_CR and STC will cause a large frequency shift in the output of VCO 312. If the gain is too large, then VCO 312 may never stabilize. If the gain is too small, stable operation could occur even if Enc_CR and Dec_TC were not close to each other.

The audio and video decoder timing is controlled via Presentation/Decode Time Stamps (PTS/DTS) that are, as indicated above, included in the respective audio or video data. Assuming PTSs occur on every image representation, the DTS (PTS, if no DTS) of the oldest image representation stored in video data buffer 302 passes to video display control 203. Video display control 303 waits until the Dec_TC value increases to the value of the oldest DTS. It then extracts the coded video data for the corresponding image representation from video data buffer 302 and passes it to video decoder 304 for decoding. For each video image representation, input to decoder 304, the image representation is supplied as the video output for display. The video output may be the same image representation as the input (e.g., for B-pictures), or it may be a stored previously decoded picture (e.g., for nonB-pictures).

If an image representation does not have a DTS, then video display control 303 computes an extrapolated DTS value by simply adding the nominal picture duration to the DTS of the previous image representation. It is assumed that video decoder 304 always completes decoding each image representation before the next image representation is due to be decoded. When the oldest received (or extrapolated) audio PTS equals Dec_TC, then a next audio access unit in audio data buffer 305 is supplied via audio display control 306 to audio decoder 207. The decoded audio is immediately passed as the audio output corresponding to the video output to be displayed.

Figure 6:
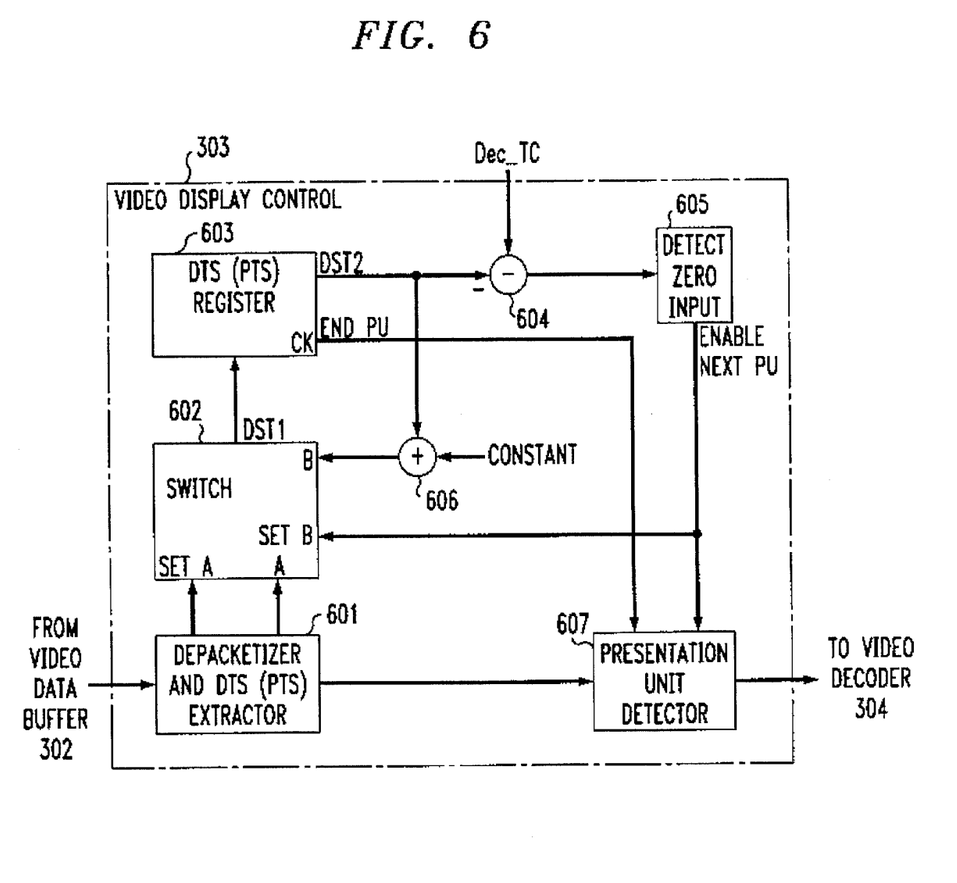
FIG. 6 shows, in simplified block diagram form, details of the video display unit of FIG. 3.

Details of the video display control 303 is shown in FIG. 6 and described below.

If there is substantial transmission jitter delay, then demultiplexer 102 may not operate correctly. This results because filter 311 of systems time clock generator 208 must average over a much longer time interval than in a jitter free situation. However, even if this is the case, a more serious problem is that the data arrival times may be considerably different than was assumed in multiplexer 100 (FIG. 2). When such an occurrence happens, there is a possibility of overflow or underflow of the video and/or audio data buffers in demultiplexer 102.

Overflow of the data buffers can be readily avoided by increasing the buffer sizes beyond what was assumed by the encoder 202 in multiplexer 100. Underflow of the data buffers can be alleviated by the addition of a "Jitter Delay" $D_j$, which causes an extra accumulation of data in the data buffers prior to decoding. The additional stored data provides insurance against underflow. If bounds on jitter delay can be guaranteed, the possibility of underflow of the data buffers can be substantially eliminated by choosing sufficiently large buffers and a sufficiently large value for $D_j$.

In real world situations, the jitter may exceed the capabilities of decoder buffer 302. In such cases, encoder 202 (FIG. 2) in multiplexer 100 can handle the effects of the jitter if it knows what it is. To this end, compute jitter unit 317 (FIG. 3) computes an estimate of the peak $J_{max}$ using as an input the discrepancy between the received Enc_CR values and the decoder Dec_TC values. The difference value Enc_CR–Dec_TC from phase comparator 310 is supplied to compute jitter unit 317.

Figure 4:
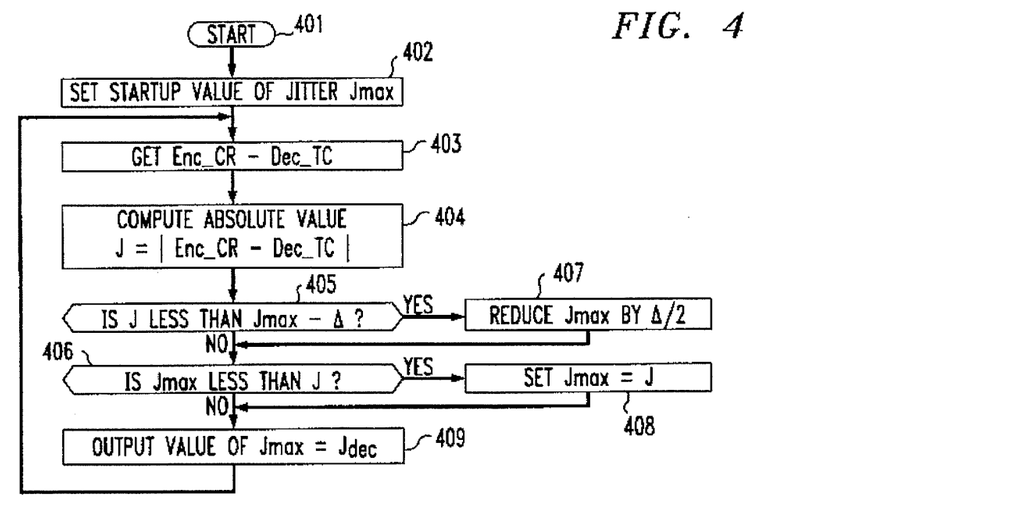
FIG. 4 is a flow chart illustrating the operation of the compute jitter unit of FIG. 3.

An example of jitter computation is shown in the flow chart of FIG. 4. The jitter computation in begun via start step 401. Then, step 402 initializes $J_{max}$ to a nominal jitter value, perhaps a value larger than any expected value. Then, step 403 reads Enc_CR–Dec_TC from comparator 310. Step 405 tests to determine if $J<J_{max}-\Delta$, where $\Delta$ is some safety factor. If the test result in step 405 is NO control is transferred to step 406. If the test result in step 405 is YES, $J<J_{max}-\Delta$, which indicates that $J_{max}$ is too large. Then, step 407 reduces $J_{max}$, for example, by $\Delta/2$ and control is transferred to step 406. Step 406 tests to determine if $J_{max}<J$. If the test result in step 406 is YES, $J_{max}<J$ which indicates that $J_{max}$ is too small. Then, step 408 increases the value of $J_{max}$, for example, to the value of J. Thereafter, step 409 outputs the value of $J_{max}$ as $J_{dec}$ which is supplied to system decoder, Enc_CR extractor and $J_{dec}$ inserter 301 (FIG. 3) and control is returned to step 403. In turn, system decoder, Enc_CR extractor and $J_{dec}$ inserter 301 supplies $J_{dec}$ to channel 101.

The entire process from the initial supplying as an output of a frame of encoded bit-stream CODEIM from encoder buffer 203 (FIG. 2) until the corresponding version of that frame in CODETR, which is received by decoder buffer 302 (FIG. 3) and is supplied to video decoder 303 takes LT seconds, exclusive of any delay in variable bit-rate channel 101. This time period of LT seconds, where T is the time period of one unencoded video frame and L is a system delay parameter not less than one (1) and not necessarily an integer, is arbitrarily selected by the implementor. After the first bit of bit-stream CODETR is received by decoder buffer 302, exactly LT seconds are waited by decoder buffer 302 before it delivers the first frame to video decoder 304. For clarity of exposition, the embodiments of the invention presented herein will be described as if L were an integer. Embodiments of the invention in which L is not an integer will be readily apparent to those skilled in the art.

Encoder buffer 203 and decoder buffer 302 each have predetermined fixed maximum sizes, $B_{max}^e$ and $B_{max}^d$ respectively, which are known to video encoder 202, channel rate control 208 and encoder rate control 209 a priori. In addition, the value of the delay factor L is known a priori by video encoder 202, channel rate control 208, encoder rate control 209 and decoder buffer 302. In some situations, L is transmitted directly to demultiplexer 102 in bit stream CODETR, and the extraction of this delay value is described below in relation to video display control unit 203 (FIG. 2).

Any method of encoding images that allows the number of bits produced as the encoded representation of each image to be specified may be employed by video encoder 202. Such methods are well known in the art. Encoder rate control 209 supplies to video encoder 202 signal RANGE. Signal RANGE is a representation of the range of acceptable numbers of bits that may be produced when encoding each frame of original video signal VIDIN into bit-stream CODEIM. In this example, the range constraining the number of bits that video encoder 202 may produce, is determined so that neither encoder buffer 203 nor decoder buffer 302 will overflow or underflow. The method of determining this range will be described below. Video encoder 202 encodes each frame of signal VIDIN and, thereby, produces a portion of bit-stream CODEIM that represents frame i and actually contains $E_i$ bits in a frame period $[(i-1)T,iT]$. $E_i$ is a number that falls within the range given by the encoder rate control 209 in signal RANGE for frame i. The frame number index i designates each frame with respect to a predetermined starting frame. The $E_i$ bits, which are a portion of bit-stream CODEIM, are supplied as an input to encoder buffer 203 and stored therein until it is time for them to be transmitted.

A selection of a set of estimated channel bit-rates $R_i$, $R_{i+1}$, ..., $R_{i+L-1}$ by channel rate control 208 is controlled by the need to prevent encoder buffer 203 and decoder buffer 302 from overflowing or underflowing. This selection is also controlled by the bit-rate constraint on variable bit-rate channel 101. This bit-rate constraint on variable bit-rate channel 101 may be time-varying. This selection is controlled also by the estimate of the received jitter, $J_{dec}$, received by channel rate controller from compute jitter unit 317 (FIG. 3). Additional factors that may be considered in the selection of the estimated channel bit-rates are the cost of transmitting each bit and the fact that for some channel constraints (for example, the well known leaky bucket constraint) the channel bit-rate could be conserved at an earlier time so as to produce a less stringent channel rate constraint later. This might be desirable if a frame of original video signal VIDIN that has been encoded using intraframe techniques will need to be transmitted soon.

Encoder rate control 209 receives as inputs the actual bit-rate $R_i$ and the estimated potential future channel bit-rate values for the next L-1 frames $R_{i+1}$, ..., $R_{i+L-1}$ that are selected, in a manner to be described, from channel rate control 208. Encoder rate control 209 also receives as an input the estimate of received jitter, $J_{dec}$, from compute jitter unit 217 (FIG. 2). Encoder rate control 209 also receives as an input the actual number of bits $E_i$ that are supplied as an output by video encoder 202 for each frame period i. The range for $E_i$ that is supplied as an output by encoder rate control 209 is determined, in a manner to be described, such that neither encoder buffer 203 nor decoder buffer 302 will overflow or underflow.

Channel rate control 208 determines the actual current channel bit-rate $R_i$ for channel 101 and the number of bits E i that is actually supplied by video encoder 202 as an output in the current frame period. An estimated channel bit-rate $R_{i+L}$, which describes the number of bits that are desired to be transmitted across channel 101 in the frame period L frames hence, is selected by channel rate control 208. Each of these selected channel bit-rates are, as noted above, supplied as an input to encoder rate control 209 and to systems encoder, Enc_CR inserter and $J_{dec}$ extractor 210.

The following theoretical exposition should prove useful to one skilled in the art in the understanding of the detailed operation of channel rate control 208 and encoder rate control 209, particularly when variable bit-rate channel 101 is constrained, in an exemplary fashion, by the leaky bucket constraint. E(t) is defined to be the number of bits (or bytes or packets) output by the encoder at time t. The instantaneous bit-rate at any given time of variable bit-rate channel 101, R(t), is variable. $B^e(t)$ and $B^{d(e)}(t)$ are the instantaneous fullnesses of encoder and decoder buffers 203 and 302, respectively, as computed by the encoder, assuming no jitter delay. Encoder buffer 203 and decoder buffer 302 each have predetermined fixed maximum sizes, $B_{max}^e$ and $B_{max}^d$, respectively. Given $B_{max}^e$ multiplexer 100 is designed to ensure that encoder buffer 203 never overflows, i.e., $$0 \leq B^e(t) \leq B_{max}^e \forall t \qquad (1)$$

Conditions which are required to be placed on bit-rates $E_i$ and $R_i$ to ensure that decoder buffer 302 never overflows or underflows, i.e., $$0 \leq B^{d(e)}(t) \leq B_{max}^d \forall t, \qquad (2)$$

are described herein.

The problem is made discrete by defining $E_i$(i=1,2, ...) to be the number of bits in the interval $[(i-1)T,iT]$, where T is the duration of one unencoded frame of unencoded video signal VIDIN. Therefore, $$E_i = \int_{(i-1)T}^{iT} E(t)dt. \qquad (3)$$

Similarly, $R_i$ is the number of bits that are transmitted over variable bit-rate channel 101 during the ith frame period, $$R_i = \int_{(i-1)T}^{iT} R(t)dt. \qquad (4)$$

which is the actual bit-rate granted by variable bit-rate channel 101.

In this description, it has been assumed that the discretization of the transmission bit-rate over variable bit-rate channel 101 is identical to that of the encoding bit-rate $E_i$. Other discretizations will be apparent to those skilled in the art.

Encoder buffer 203 receives bits at bit-rate E(t) from video encoder 202 and supplies as an output bits of encoded video bit-stream CODEIM at a bit-rate R(t). Therefore, assuming that encoder buffer 203 and decoder buffer 302 are empty prior to start-up at time t=0

$$B^e(t) = \int_0^t [E(s) - R(s)]ds, \qquad (5)$$

the encoder buffer fullness after encoding frame i is $$B_i^e = B^e(iT) = \int_0^{iT} [E(s) - R(s)]ds. \qquad (6)$$

This can be written explicitly as $$B_i^e = \sum_{j=1}^{i} E_j - \sum_{j=1}^{i} R_j, \qquad (7)$$

or recursively as $$B_i^e = B_{i-1}^e + E_i - R_i. \qquad (8)$$

After demultiplexer 102 begins to receive data in decoder buffer 302, it waits LT seconds before starting to decode, as described above. Again, it is assumes for clarity purposes that L is an integer, although this is not necessary.

A new time index $\tau$, is defined for demultiplexer 102. $\tau$ is zero when decoding begins. Therefore, $$t=\tau+LT+\text{channel r.delay} \quad (9)$$

where channel.delay is the transmission delay time across variable bit-rate channel 101. Multiplexer unit 100 can calculate the initial fullness of decoder buffer 302, $B^{d(e)}(0)$ (when $\tau=0$), if L is predetermined or transmitted explicitly as a parameter to demultiplexer 102. The initial fullness of decoder buffer 302 is given by $$B_0^{d(e)} = \sum_{j=1}^{L} R_j. \quad (10)$$

The fullness of decoder buffer 302 at time $\tau=iT$ can be determined by $$B_i^{d(e)} = B_{i-1}^{d(e)} + R_{L+i} + E_i. \quad (11)$$

$$B_i^{d(e)} = B_0^{d(e)} + \sum_{j=1}^{i} R_{L+j} - \sum_{j=1}^{i} E_j. \quad (12)$$

In the arrangement disclosed in our prior U.S. Pat. No. 5,159,447 issued Oct. 27, 1992, the encoder ensured correct operation of the decoder buffers, assuming no delay jitter. However, if delay jitter is present, the encoder cannot know the exact fullness of the decoder buffer. Here, we extend the buffer dynamic equations to include the possibility of short-term jitter, where data arrive either early or late to the decoder. The maximum delay jitter is defined to be $J_{max}$. We assume the decoder clock is stable and accurate. We assume throughout that the jitter is much less than the buffering delay LT.

Because of arrival jitter, the encoder cannot know exactly the fullness of the decoder buffer. The encoder can, however, compute a nominal buffer fullness that corresponds to the case when there is no jitter. The actual buffer fullness will differ from this because of the jitter.

Let $B_i^{d(d)}$ be the actual decoder buffer fullness at time i and $B_i^{d(e)}$ be the nominal buffer fullness as computed by the encoder, assuming no jitter. Let $R_{L+i}$ be the number of bits which arrive at the decoder buffer during the i-th interval, and let $E_i$ be the number of bits that leave the decoder buffer during the i-th interval.

In general, the encoder computes $B_i^{d(e)}$ as described in Equation (11). However, if data arrive too late, the decoder buffer may be less full than the encoder expected, in which case, $J_{max}R_{L+i}$ less data will have been received by the decoder buffer. So the actual decoder buffer fullness, $B_i^{d(d)}$, will differ from that expected by the encoder, $B_i^{d(e)}$:

$$B_i^{d(d)} \geq B_i^{d(e)} - J_{max} R_{L+1}. \quad (13)$$

Similarly, if data arrives too early, the decoder buffer may be fuller than expected. In this case, the fill-rate of the decoder buffer is now $R_{L+i+1}$.

$$B_i^{d(d)} \leq B_i^{d(e)} + J_{max} R_{L+i+1}. \quad (14)$$

Equations (13) and (14) can be combined to obtain bounds on the actual decoder buffer fullness given the decoder buffer fullness computed at the encoder and the actual maximum jitter.

If the encoder knows the correct value of $J_{max}$, it can ensure that the decoder's buffers will not underflow or overflow by satisfying the following Equation:

$$J_{max} R_{L+i} \leq B_i^{d(e)} \leq B_{max}^d - J_{max} R_{L+i+1}. \quad (15)$$

If the future transmission bit-rate $R_{L+i+1}$ is unknown at the encoding time i, an upper bound can be used in its place. The more accurately $R_{L+i+1}$ is known, the more fluctuations can be allowed in the encoded bit-rate and, hence, better video quality can be produced.

In a real system, the encoder may not know the correct value of $J_{max}$. The decoder must compute and send this information to the encoder. It is possible that the decoder may not observe (and hence be able to transmit) the maximum jitter to the encoder until after it occurs. The decoder may also not detect that jitter is occurring in the unlikely event that all packets with Enc_CRs are jittered identically. Furthermore, there is some transmission delay between the decoder and the encoder. Therefore, decoder buffer overflow or underflow could occur before the encoder receives the correct value of $J_{max}$.

One solution is to have the decoder start with a large estimate of jitter and reduce it over time. In addition, if the encoder does adjust its coding parameters based upon available jitter information, the probability of overflow or underflow is minimized. Furthermore, if the decoder can estimate the maximum jitter exactly, the encoder can restrict the interval during which overflow and decoder problems can occur to the transmission delay interval.

The preceding analysis assumed that the decoder clock was stable and accurate. However, even if the decoder clock is stable with the correct frequency, it could have a constant offset of as much as $J_{max}$. For example, in the pathological case that all packets containing encoder clock references, Enc_CR, are all delayed by $J_{max}$, the decoder's time clock, D_TC, would be slow by $J_{max}$. If the clock is slow, the decoder would remove data from its buffer later than expected by the encoder, and if the clock is slow, data would be removed too soon. If this is taken into account, Equation (15) becomes $$2J_{max} R_{L+1} \leq B_i^{d(e)} \leq B_{max} - 2J_{max}^d R_{L+i+1}. \quad (16)$$

These differences could be accommodated by using an overestimate of the jitter value in the encoder.

Conditions necessary to prevent underflow and overflow of encoder buffer 203 and decoder buffer 302 are presented for a general variable bit-rate channel. To prevent encoder buffer overflow and underflow, it is required from Equation (1) and Equation (8) that $$0 \leq B_{i-1}^e - E_i - R_i B_{max}^e \quad (17)$$

$$R_i - B_{i-1}^e \leq E_i \leq B_{max}^e + R_i - B_{i-1}^e \quad (18)$$

which represents a constraint on the number of bits $E_i$ that may be supplied for each encoded frame of bit-stream CODEIM for a given channel bit-rate $R_i$ granted by variable bit-rate channel 101. For example, when variable bit-rate channel 101 has a constant rate, multiplexer 100 can prevent encoder buffer 203 from overflowing or underflowing by varying the quality of the coding employed by video encoder 202. If multiplexer 100 determines that encoder buffer 203 is approaching fullness, the bit-rate of bit-stream CODEIM being supplied as an input by video encoder 202 to encoder buffer 203 is reduced. Such a reduction in the bit-rate of bit-stream CODEIM may be achieved by reducing the quality of the encoding performed by video encoder 202. One method of reducing the encoding quality is to employ a coarser quantization step size. Such methods of reducing encoding quality are well known in the art. Conversely, if encoder buffer 203 threatens to underflow, video encoder 202 can generate bit-stream CODEIM with a higher bit-rate, either by increasing the quality of encoding performed by video encoder 202, or by supplying as an output stuffing bits that are consistent with the coding syntax and can be discarded by video decoder 304.

To prevent decoder buffer 302 from overflowing or underflowing the following constraints on the bit-rate of video encoder 202 for a given channel bit-rate can be imposed:

$$J_{max}R_{i+L}0 \leq B_{i-1}^{d(e)} + R_{i+L} - E_i \leq B_{max}^d - J_{max}R_{1+L+1} \quad (19)$$

$$-J_{max}R_{i+L} + R_{i+L} + B_{i-1}^{d(e)} \leq E_i \leq R_{i+L} + B_{i-1}^{d(e)} - B_{max}^d + J_{max}R_{i+L+1}. \quad (20)$$

Alternatively, the number of bits per frame can be unconstrained thereby yielding the following constraint on the channel bit-rate $R_i$:

$$E_i - B_{i-1}^{d(e)} \leq (1 - J_{max})R_{i+L} \leq E_i + [B_{max}^d - B_{i-1}^{d(e)}] - J_{amx}R_{i+L+1} \quad (21)$$

which is the same as, for i>L $$E_{i-L} - B_{i-L-1}^{d(e)} \leq (1 - J_{max})R_i \leq E_{i-L} + [B_{max}^d - B_{i-L-1}^{d(e)}] - J_{max}R_{i+1} \quad (22)$$

where $E_{i-L} - B_{i-L-1}^{d(e)} \leq (1 - J_{max})R_i$ specifies the condition in which underflow of decoder buffer 302 occurs and $(1 - J_{max})R_i \leq E_{i-L} + [B_{max}^d - B_{i-L-1}^{d(e)}] - J_{max}R_{i+1}$ specifies the condition in which overflow of decoder buffer 302 occurs. Therefore, there is a restriction on the channel bit-rate $R_i$ that is dependent upon the output supplied by video encoder 202 L frames ago.

The right side of Equation (22) can be used to obtain an additional constraint on $R_i$:

$$R_{i+1}J_{max} \leq E_{i-L} + [B_{max}^d - B_{i-L}^{d(e)}] - (1 - J_{max})R_i \quad (23)$$

or $$R_i \leq [E_{i-L-1} + [B_{max}^d - B_{i-L-2}^{d(e)}] - (1 - J_{max})R_{i-1}]/J_{max} \quad (24)$$

A counter (not shown) indicating the fullness of an imaginary buffer is maintained by variable bit-rate channel 101 when it is constrained by a leaky-bucket function. $R_i$ bits for frame period i are supplied as an input to the imaginary buffer (henceforth called the "bucket" herein). The bit-rate at which bits are supplied as an output from the bucket is $\bar{R}$ bits per frame period. The bucket size is $N_{max}$. The instantaneous bucket fullness after frame i has been supplied to variable bit-rate channel 101 is $$N_i = N_{i-1} + R_i - \bar{R} = \sum_{j=1}^{i} R_j - i\bar{R}. \quad (25)$$

To ensure that high-priority are not dropped, the bit-rate $R_i$ must be such that the bucket never overflows, i.e., $N_i \leq N_{max}$ $\forall i$, or $$R_i \leq N_{max} - N_{i-1} + \bar{R} = N_{max} - \sum_{j=1}^{i-1} R_j + i\bar{R}. \quad (26)$$

Equation (26) defines the leaky-bucket constraint on the bit-rate that can be supplied as an input to variable bit-rate channel 101.

However, the leaky-bucket constraint is not the only constraint. In fact, preventing overflow of decoder buffer 302 can impose a stronger constraint on the bit-rate that can be supplied as an input to variable bit-rate channel 101. In particular, the right side of the decoder bit-rate constraint specified in Equation (22) may be stricter than the leaky-bucket bit-rate constraint of Equation (26).

The upper bound on $R_i$ in the right side of Equation (22) depends on $R_{i+1}$, which may not be known before estimating $R_i$. However, an upper bound on $R_{i+1}$ can be obtained from the leaky bucket constraint:

$$R_{i+1} \leq N_{max} - N_i + \bar{R} \quad (27)$$

or $$R_{i+1} \leq N_{max} - N_{i-1} - R_1 + 2\bar{R} + R_{i+1}^{UB}. \quad (28)$$

Substituting into the right side of (22), $R_i$ can be chosen to satisfy $$(1 - J_{max})R_i \leq E_{i-L} + B_{max}^d - B_{i-L-1}^{d(e)} - J_{max}(N_{max} - N_{i-1} - R_i + 2\bar{R}) \quad (29)$$

$$(1 - 2J_{max})R_i \leq E_{i-L} + B_{max}^d - B_{i-L-1}^{d(e)} - J_{max}(N_{max} - N_{i-1}2\bar{R}) \quad (30)$$

And so decoder buffer overflow and underflow can be avoided, when the jitter is less than $J_{max}$, if $$(E_{i-L} - B_{i-L-1}^{d(e)})/(1 - J_{max}) \leq R_i \leq [E_{i-L} + B_{max}^d - B_{i-L-1}^{d(e)} - J_{max}(N_{max} - N_{i-1} + 2\bar{R})]/(1 - 2J_{max}) \quad (31)$$

Note that Equation (31) assumes $J_{max} < \frac{1}{2}$ seconds, which should always be the case in practice.

Figure 5:
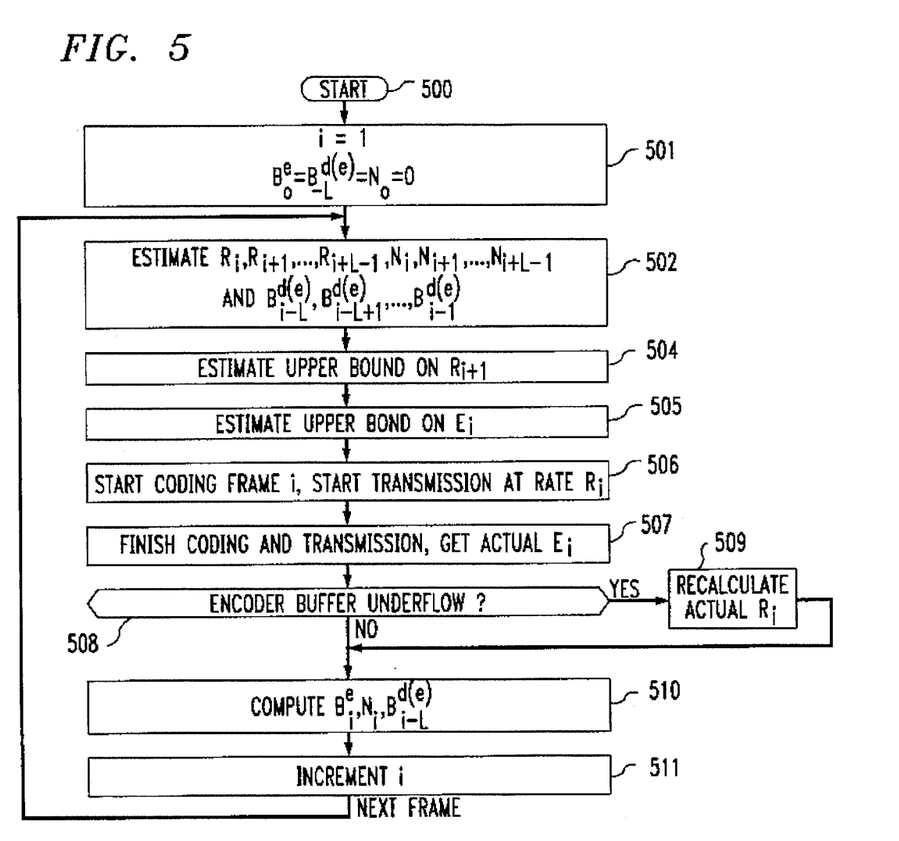
FIG. 5 is a flow chart illustrating the video encoder buffer control when an effectively variable bit-rate channel is constrained.

The principles of buffer control for exemplary multiplexer 100 when variable bit-rate channel 101 having a leaky bucket bit-rate constraint are illustrated, in flow chart form, in FIG. 5. Accordingly, the routine is entered via step 500 upon the arrival of the first frame of original video signal VIDIN. Step 501 performs variable initialization at time t=0 prior to encoding frame i=1. $B_i^e$ representing the fullness of encoder buffer 203 at time t=iT, $B_{-L}^{d(e)}$ representing the nominal fullness of decoder buffer 302 as computed by the encoder, assuming no jitter, at time τ=iT, and $N_i$ representing the fullness of the leaky bucket at time t=iT are all initialized to zero (0). In step 502, estimates of bit-rates available from variable bit-rate channel 101 for present frame i of original video signal VIDIN and for the next L future frames of original video signal VIDIN are determined. Also, upper bounds on future bit-rates are determined. Additionally, leaky bucket fullnesses and nominal fullnesses of decoder buffer 302 for the same next L future frames are estimated. For estimating channel bit-rates inequalities Equation (22) and Equation (26) are employed, where the estimate $J_{dec}$ replaces the actual jitter value $J_{max}$. For k≤0, $E_k$=0. Leaky bucket fullnesses and fullnesses of decoder buffer 302 are determined from, respectively, Equation (25) and Equation (12). Rewriting them, for j=i,i+1, . . . ,i+L−1 yields $$(E_{j-L} - B_{j-L-1}^{d(e)})/(1 - J_{dec}) \leq R_j \leq [E_{j-L} - B_{max}^d - B_{j-L-1}^{d(e)} - J_{dec}(N_{max} - N_{j-1} + 2\bar{R})]/(1 - 2J_{dec}), \quad (32)$$

where the left inequality of Equation (32), $(E_{j-L} - B_{j-L-1}^{d(e)})/(1 - J_{dec}) \leq R_j$ indicates an underflow condition for decoder buffer 302 and the right inequality of Equation (32), $\leq [E_{j-L} + B_{max}^d - B_{j-L-1}^{d(e)} - J_{dec}(N_{max} - N_{j-1} + 2\bar{R})]/(1 - 2J_{dec})$, indicates an overflow condition for decoder buffer 302, $$R_j \leq N_{max} - N_{j-1} + \bar{R}, \quad (33)$$

$$R_j \leq [E_{j-L-1}B_{+max}^d - B_{j-L-1}^{d(e)} - (1 - J_{dec})R_{j-i}]/J_{dec}, \quad (34)$$

$$N_j = N_{j-1} + R_j - \bar{R}, \quad (35)$$

and $$B_{j-L}^{d(e)} = B_{j-L-1}^{d(e)} + R_j - E_{j-L}. \quad (36)$$

By substituting the above noted j values in Equation (36) the nominal fullness values of step 502 are obtained.

In most cases, for j<i+L−1 we can simplify and reuse previous estimates, in which case evaluations need be made only for j=i+L−1. However, as shown below, $B_{i-L+1}^{d(e)}$ can change and, therefore, reevaluation of all estimates can be desirable. In general, a value of $R_j \leq 0$ that is equal to whichever upper bound of Equation (32), Equation (33) and Equation (34) is smaller is a good choice. However, if it is know that a frame with a large number of bits is imminent, smaller values may be desirable. Smaller values of $R_j$ may be also be desirable if the channel were a video disk so as to employ as few bits as possible. When smaller values of $R_j$ are chosen, they are chosen to be larger than the lower bound of Equation (32) to prevent decoder buffer underflow.

For $i \leq L$, no frames are yet being decoded by video decoder 304, and decoder buffer 302 is merely filling. In general, the sum of $R_1, \ldots, R_L$ should be chosen to exceed the expected bit-rate of the first few frames of bit-stream CODEIM in order to avoid underflow of decoder buffer 302.

Step 504 estimates an upper bound (UB) on $R_{i+L}$ by using the leaky bucket constraint specified in Equation (33)

$$R_{i+L} \leq UB\ R_{i+L} = N_{max} - N_{i+L-1} + \bar{R} \quad (37)$$

In step 505 an upper bound on $E_i$ is determined by encoder rate control 209 in. This upper bound is determined by employing constraints on the overflow of encoder buffer 203 from inequality Equation (18) and underflow of decoder buffer 302 from inequality Equation (19)

$$E_i \leq B_{max}^e + R_i - B_{i-1}^e. \quad (38)$$

$$E_i \leq UBR_{i+L} + B_{i-1}^{d(e)} - J_{max} UBR_{i+L}. \quad (39)$$

The minimum of these two upper bounds on $E_i$ is supplied as an output by encoder rate control 209 as signal RANGE to video encoder 202.

Step 506 begins encoding of frame i by video encoder 202 subject to the bounds on $E_i$ and the transmission of a frame from encoder buffer 203 at bit-rate $R_i$. In step 507 the encoding of frame i by video encoder 202 and transmission through variable bit-rate channel 101 of the frame supplied from encoder buffer 203 are completed. Video encoder 202 then supplies the actual value of $E_i$ as an input to channel bit-rate control 208 and encoder rate control 209. The actual value of $E_i$ is used, in conditional branch point 508, to evaluate inequality Equation (17) and, thereby, determine if underflow of encoder buffer 203 occurred during the coding of frame i. If the test result in step 508 is NO, control is passed to step 510. If the test result in step 508 is YES, channel rate control 208 and channel interface 80 terminate transmission early, and control is passed to step 509 which calculates the new lower value of $R_i$ as $$R = B_{i-1}^e + E_i. \quad (40)$$

Thereafter, control is passed to step 510. Step 510 uses actual values of $E_i$ and $R_i$ to compute actual values of $B_i^e$, $N_i$ and $B_{i-L}^{d(e)}$ using Equations (8), (35) and (36), respectively. In step 511 i is incremented in preparation for encoding the next frame. If step 509 was not executed, then all values previously estimated in step 502 are still valid, and for the next frame only an estimate for the latest time interval need be evaluated. If step 509 was executed, then $B_{i-L}^{d(e)}$ has changed, and all values previously estimated in step 502 must be reevaluated.

FIG. 6 shows, in simplified block diagram form, details of a display control unit which may be employed for either video display control 303 or audio display control 306. It is noted that for audio display control 306 only PTS values are employed. Specifically shown is depacketizer and DTS (PTS) extractor 601 which strips off packet headers and detects the presence of DTS and/or PTS. (The first packet received is required to contain a PTS.) If PTS/DTS is detected (set DTS=PTS if no DTS), then switch 602 is set to the A position via a signal from depacketizer and DTS (PTS) extractor 601, and the DTS value is supplied to the A input of switch 602. In turn, the supplied DTS value is supplied as an output by switch 602 as DTS1 to DTS (PTS) register 603.

After stripping off packet headers, depacketizer and DTS (PTS) extractor 601 passes the remaining packet data upon request to presentation unit (PU) detector 607. For video display control 303, a PU is an image representation (i.e., picture). For audio display control 306, a PU is an Audio Access Unit (AAU). At the start of every first PU (and no others), presentation unit detector 607 outputs a clock pulse that clocks DTS (PTS) register 603, thus causing its input DTS1 to be read, stored and then supplied as an output as DTS2 to subtractor 604 and adder 606. Then, presentation unit detector 607 waits. Dec_TC values are supplied to subtractor 604, where they are compared with the stored DTS2 values. The resulting difference Dec_TC–DTS2 is supplied to zero detector 605. When Dec_TC increases to a value equal to DTS2, enable the next PU signal is supplied as an output to presentation unit detector 607 and the set B input to switch 602. This allows the next PU to be passed to the decoder 304. For video display control 303, upon receiving this enable next PU signal presentation unit detector 304 transfers the data for the next PU to video decoder 304. Similarly, for audio display control 306, the enable next PU signal causes presentation unit detector 607 to transfer the data for the next PU to audio decoder 307. As indicated, the enable next PU signal also causes switch 602 to be set to the B position. If during the output of the PU depacketizer and DTS (PTS) extractor 601 detects a PTS/DTS, it sets switch 602 to the A position as before. However, if no PTS/DTS is detected, switch 602 remains in the B position. At the end of a PU data transfer by presentation unit detector 607, it outputs a clock pulse to the clock input of DTS (PTS) register 603, as before. If a new DTS value has arrived, it is read, as before, from the A input of switch 602 and supplied as a DTS1 value to register 603 and appears as a DTS output value from register 603. However, if no new DTS value has arrived, then switch 602 still remains in the B position. In this situation, an extrapolated DTS value is supplied from adder 606 and is supplied as a new DTS1 value to register 603 and appears at an output thereof as DTS2. This extrapolated DTS value is obtained by adding via adder 606 a constant nominal picture duration value in units of Dec_TC to the previous DTS2 value. For example, if the nominal picture frequency is 29.97 Hz and the Dec_TC frequency is 90 kHz, then the constant is 3003. Presentation unit detector 607 then waits until Dec_TC increases to this new value of DTS2, whereupon it receives an enable next PU signal (pulse) from zero detector 605, thus repeating the data output cycle.

The above-described arrangements are, of course, merely illustrative of the applications of the principles of the invention. Other arrangements may be devised by those skilled in the art without departing with the spirit and scope of the invention.

We claim:

1. Apparatus in an encoder unit for encoding an original video signal including frames, wherein each frame contains at least one image representation, and for supplying as an output for transmission, to a variable bit-rate channel, an encoded version of said original video signal including encoded frames containing at least one encoded image representation, the variable bit-rate channel being adapted for supplying said encoded version of said original video signal to a remote decoder unit including at least one decoder buffer for storing the encoded version of the original video signal and at least one video decoder for generating a reconstructed version of the original video signal, the apparatus comprising:

adjustable encoder means responsive to a range indication for encoding each of said frames of said original video signal into a first encoded version in which each frame of said original video signal is represented by a plurality of bits, the actual number of said bits for each frame being within said range, each of said first encoded frames being supplied as an output as a first encoded version of said original video signal;

encoder buffer means for storing said first encoded version of said original video signal and for supplying as an output each frame of said first encoded version of said original video signal;

means responsive to a representation of jitter at the remote decoder and to an actual number of bits within at least one frame of said first encoded version of said original video signal for generating bit-rate requests for a current frame to be supplied to said channel and for generating a set of estimated transmission rates that are expected to be supplied by said channel for a predetermined number of future frames of said encoded version of said original video signal; and means responsive to said jitter representation and to said actual number of bits within at least one frame of said first encoded version of said original video signal and said set of estimated transmission rates, for developing said range such that overflow or underflow of said encoder buffer means and said at least one decoder buffer is avoided.

* * * * *